(12) United States Patent
Kiryazov et al.

(10) Patent No.: US 10,200,355 B2
(45) Date of Patent: Feb. 5, 2019

(54) METHODS AND SYSTEMS FOR GENERATING A USER PROFILE

(71) Applicant: Insurify, Inc., Cambridge, MA (US)

(72) Inventors: Todor V. Kiryazov, Boston, MA (US); Steven G. Moseley, Boston, MA (US); Snezhina Zacharia, Winchester, MA (US)

(73) Assignee: Insurify, Inc., Cambridge, MA (US)

( * ) Notice: Subject to any disclaimer, the term of this patent is extended or adjusted under 35 U.S.C. 154(b) by 178 days.

(21) Appl. No.: 15/418,650

(22) Filed: Jan. 27, 2017

(65) Prior Publication Data

US 2018/0063110 A1 Mar. 1, 2018

Related U.S. Application Data

(60) Provisional application No. 62/380,493, filed on Aug. 29, 2016.

(51) Int. Cl.
*H04L 29/06* (2006.01)
(52) U.S. Cl.
CPC ............ *H04L 63/08* (2013.01); *H04L 63/104* (2013.01)
(58) Field of Classification Search
CPC ... H04L 63/08; H04L 63/10; H04L 2463/081; H04L 2463/082; H04L 9/0861;
(Continued)

(56) References Cited

U.S. PATENT DOCUMENTS 7,155,739 B2 * 12/2006 Bari .................. G06F 21/41
726/6
2001/0012777 A1 * 8/2001 Igarashi ................ H04L 63/08
455/435.1
(Continued)

FOREIGN PATENT DOCUMENTS

WO WO-2013074001 A2 * 5/2013 ............. G06Q 40/02

OTHER PUBLICATIONS

Aghasaryan et al. "Multi-Source User Profiling and Keyword Inference for Personalized Application Enablement" [Online], 2009 [Retrieved: Sep. 8, 2018], www.ieee.org, Retrieved from: < https://ieeexplore.ieee.org/stamp/stamp.jsp?tp=&arnumber=5357091 > (Year: 2009).*

*Primary Examiner* — Eric W Shepperd
(74) *Attorney, Agent, or Firm* — Finnegan, Henderson, Farabow, Garrett & Dunner, LLP

(57) ABSTRACT

Systems and methods are provided for authenticating a user. The systems and methods include receiving a request to generate a user profile from a device of a user. The systems and methods may determine first information associated with a first entity from the request, and may also determine second information associated with a second entity distinct from the first entity from the request. The systems and methods may access, using system credentials not associated with the user, multiple distinct data sources in a specified order to retrieve additional information. Accessing these multiple distinct data sources may include retrieving a first item of the additional information using the first information, and retrieving a second item of the additional information using the second information. The systems and methods may authenticate the user based on the additional information, and may generate a user profile based in part on the additional information.

23 Claims, 8 Drawing Sheets

(58) Field of Classification Search
CPC ..... H04L 9/0866; H04L 9/088; H04L 9/0894; H04L 9/14; H04L 9/32
See application file for complete search history.

(56) References Cited

U.S. PATENT DOCUMENTS

| | | | |
|---|---|---|---|
| 2002/0194033 A1* | 12/2002 | Huff | G06Q 40/02 705/4 |
| 2006/0242661 A1* | 10/2006 | Bodlaender | G06F 17/30035 725/9 |
| 2008/0077614 A1* | 3/2008 | Roy | G06F 17/30702 |
| 2009/0012861 A1* | 1/2009 | Krishnaswamy | G06F 17/30867 705/14.64 |
| 2010/0153525 A1* | 6/2010 | Parekh | G06F 17/30241 709/221 |
| 2013/0117204 A1* | 5/2013 | Vadlamani | G06N 5/022 706/12 |
| 2014/0149384 A1* | 5/2014 | Krishna | G06F 17/30035 707/711 |
| 2014/0172479 A1* | 6/2014 | Gallagher | G06Q 10/06311 705/7.15 |
| 2016/0063536 A1* | 3/2016 | Deshpande | G06Q 30/0242 705/14.41 |
| 2016/0125170 A1* | 5/2016 | Abramowitz | G06F 19/328 705/2 |
| 2017/0212997 A1* | 7/2017 | Buonfiglio | G06F 19/328 |
| 2017/0374070 A1* | 12/2017 | Shah | H04L 63/20 |
| 2018/0032757 A1* | 2/2018 | Michael | G06F 21/6245 |

* cited by examiner

METHODS AND SYSTEMS FOR GENERATING A USER PROFILE

RELATED APPLICATIONS

This application claims the benefit of U.S. Provisional Application No. 62/380,493, filed Aug. 29, 2016, which is incorporated herein by reference in its entirety.

SUMMARY

The disclosed systems and methods may improve generation of user profiles by enabling automatic generation of a user profile without requiring an independent authentication process. As discussed in detail below, these improvements may be achieved by accessing multiple distinct data sources using multiple items of information received from a user. The information retrieved may be used to identify the user.

Many employers and service providers create user profiles to better serve their employees and customers. Such user profiles may include descriptive information about individuals. For example, an employer may create user profiles that describe employees. As a non-limiting example, such a user profile may include descriptive information indicating facilities an employee is authorized to access, a configuration of the employee's computer, a job title, contact information, and salary and benefit information. A service provider may create user profiles that include descriptive information about previous, present, or potential customers. Such descriptive information may include characteristics that are relevant to the provided service. As a non-limiting example, an insurance provider may generate a quote for an insurance product based on a user profile including age, sex, address, and driving record. However, in order to make use of such information, the user profile must first be created.

In a basic setup, a user may provide the information included in the profile. For example, the user may retrieve any necessary information from various data sources. In some cases, items of the information, or the information as a whole, may be sufficient to identify the user. Furthermore, at least some of the information may be sensitive. As a non-limiting example, such sensitive information may include financial information of the user (e.g., credit card information, asset information), demographic information of the user (e.g., age, sex, marital status, occupation, family size or composition), government records regarding the user (e.g., driving records, criminal records, security clearances, tax information), or corporate records regarding the user (e.g., job title, salary, benefits, performance reviews, computer access restrictions). A data source may be configured to restrict access to the information it provides. For example, this information may be sensitive, confidential, and/or proprietary. Therefore a data source may be configured to limit access to authorized parties, such as customers. These data sources may be separate, and may be associated with distinct entities. Therefore, in some implementations, the user may need to provide access credentials to each data source in order to retrieve the information. But this may pose a serious administrative burden on the user. For example, they may be obligated to remember multiple sets of access credentials, and may have to navigate multiple differing user interfaces. Furthermore, one or more of the data sources may include information that the user is not authorized to receive. For example, one or more of the data sources may include an assessment of the user, which may be confidential. Additionally, the user may provide false information for inclusion in the profile. For example, the user may indicate that they are entitled to greater access privileges than they are, or may misrepresent personal information, such as place of residence or criminal record.

These problems may be addressed using a computerized profile generation system. The profile generation system may interact with the data sources on behalf of the user, reducing administrative burden. In some implementations, this system may also retrieve and include information in the user profile that the user is not authorized to receive. For example, the user may not be authorized to access a data source, but the system may be associated with an entity, such as a legal or natural person, that is authorized to access the data source. Such a computerized profile generation system may also prevent the user from providing false information for inclusion in the profile.

However, such a profile generation system may present additional complications. Access credentials may differ between data sources. Likewise, the keys required to retrieve the appropriate records may differ between data sources. In some implementations, this may require the client to participate in a multi-part setup process with the profile generation system. During this setup process, the user may be required to provide access credentials and keys for multiple data sources. When performed manually, this setup process may be error-prone and tedious.

These problems may be addressed by enabling the computerized profile generation system to access the data sources without credentials provided by the user. In some implementations, the profile generation system may have credentials, and may use these credentials to access the data sources on behalf of the user. But the computerized profile generation system must now authenticate the user. Otherwise, another, potentially malicious, party may use the computerized profile generation system to create a profile for a user without the knowledge or consent of the user.

Requiring the computerized profile generation system to authenticate the user in addition to generating the profile may present additional complications. In some implementations, the computerized profile generation system may require the user provide access credentials. Such credentials may include authentication tokens, or usernames and passwords. These credentials may be associated with the user, to prevent spoofing or other abuse. For example, in order to create a user profile with the computerized profile generation system, the user may be required to first create an account with a username and password, and then verify an association between her identity and that account. Such verification may require the user to provide personally identifiable information, such as a social security number, driver's license number, credit card number, or address. The burden of providing this information may reduce the benefits provided by the computerized profile generation system. Furthermore, users not intending to make frequent use of the computerized profile generation system may be unwilling to expend the effort to create such credentials. More frequent users may have difficulty remembering their credentials. To alleviate their frustration, the computerized profile generation system may require mechanisms for resetting or retrieving passwords. From a security standpoint, these mechanisms may create an additional point of vulnerability, and may therefore need to balance security against ease-of-use.

The disclosed systems and methods describe an innovative concept for creating a user profile from multiple distinct data sources by combining creation of the user profile with identification or authentication of the user. The resulting system may realize the benefits of a computerized profile generation system without the additional complications described above. Consistent with the disclosed embodiments, a form of multi-factor authentication may be used, in which multiple components are used in conjunction with the information provided by the data sources to identify or authenticate the user. In some embodiments, a component may comprise information expressly provided by the user. This information may be publicly available. In various embodiments, a component may comprise information intrinsically provided by the user. This information may be intrinsically provided during communication between the user and the profile generation system. As an additional benefit, providing information intrinsically may reduce the amount of information the user must provide.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
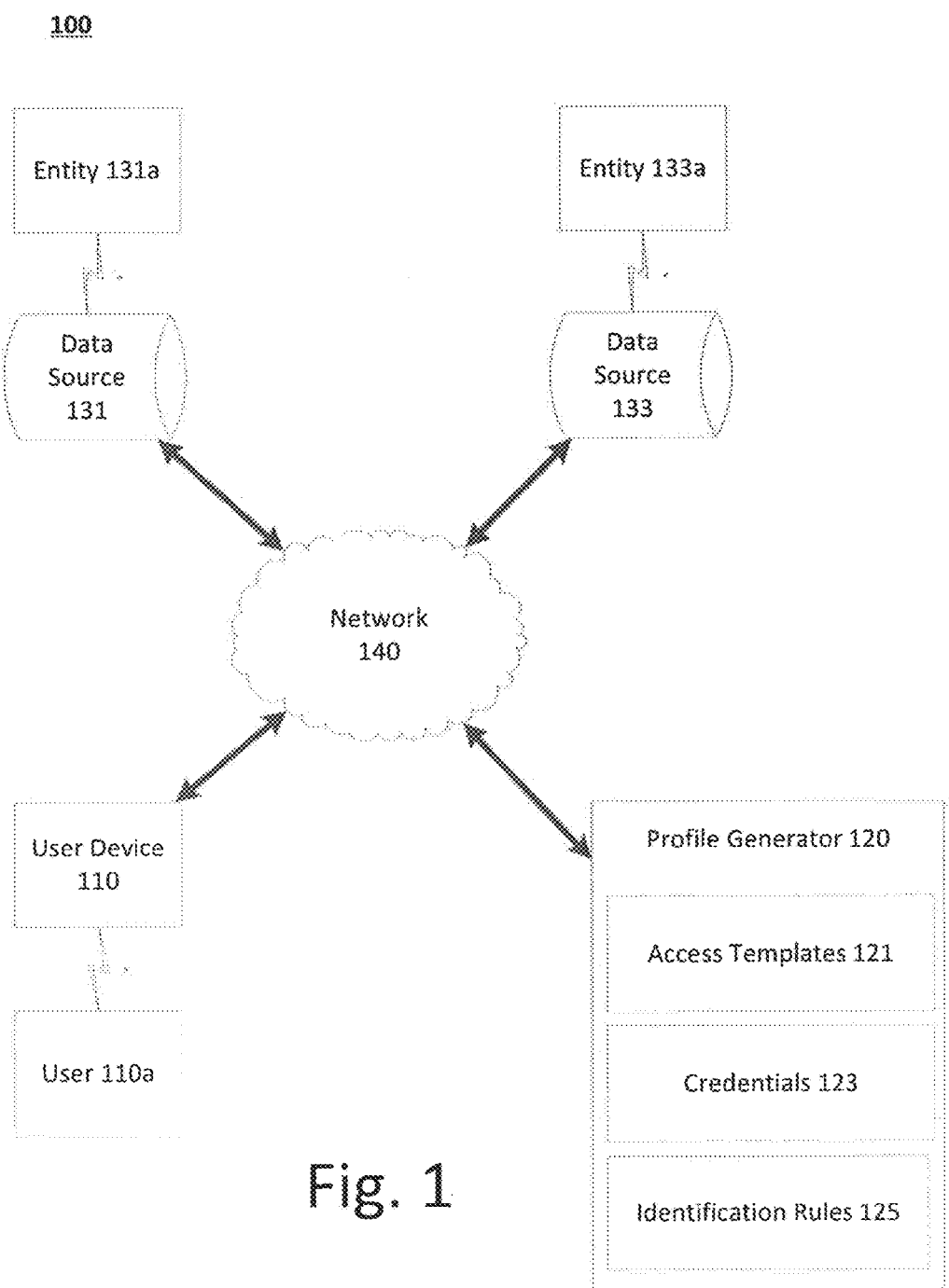
FIG. 1 depicts an exemplary system for generating a user profile.

FIG. 1 depicts an exemplary system for generating a user profile (system 100), consistent with disclosed embodiments. System 100 may comprise a profile generator 120 that communicates with user device 110 and multiple distinct data sources, such as data source 131 and data source 133 over network 140. Profile generator 120 may be configured to receive a request to generate a profile from user device 110. In response to the request, profile generator 120 may be configured to access the multiple distinct data sources to retrieve information concerning user 110a. As described below, the identity of user 110a may be unknown to profile generator 120 when the request is received. In some embodiments, profile generator 120 may be configured to generate the user profile without obtaining authentication and/or authorization credentials from user 110a. As would be appreciated by one of skill in the art, the disclosed arrangement of components is not intended to be limiting. Additional components may be added or removed, or existing components combined or divided, without departing from the envisioned subject matter. Furthermore, consistent with disclosed embodiments, system 100, and each component of system 100, may be implemented in a single device, or distributed among multiple devices, without departing from the envisioned subject matter.

In some embodiments, profile generator 120 may be configured to generate the user profile without requiring the user first engage in a registration process. As would be appreciated by one of skill in the art, such a registration process may normally be required for new users. For example, a new user may be required to provide a username and password, and may additionally be required to provide contact information, such as an email address. This information may be used to create and verify a user account for the new user. Instead, in some embodiments, profile generator 120 may be configured to generate the user profile based on information derived from the request.

As used herein, a "credential" may include a username and password identifying the user, an authentication token identifying the user, a tracking cookie identifying the user, a digital certificate, or similar authentication data and/or instructions. Such credentials may be configured to allow systems to rely upon them to identify users. For example, a system may be configured to identify a user based on a combination of username and password. In general, such credentials may only be distributed to the user. For example, a user should not distribute the private key in a public key/private key pair.

In contrast, as used herein, "publicly available" information may include information easily provided by parties other than the user. Unlike credentials, publicly available information may provide little or no assurance about the identity of the individual providing the information. Non-limiting examples of publicly available information may include license plate number, email address, employee id, name, address, and telephone number.

As used herein, data sources or systems may be "distinct" when they are associated with differing entities. For example, a data source operated or controlled by a first bank may be distinct from a data source operated or controlled by a second bank, a data source operated or controlled by a governmental organization, or another data source operated or controlled by a credit bureau. Likewise, profile generator 120 and the multiple distinct data sources may be operated or controlled by differing entities. In some embodiments, such data sources or systems may have independent authentication requirements. For example, the first bank may require the user present first credentials to access the first data source, while the second bank may require the same user present second credentials to access the second data source.

As used herein, a "user profile" may comprise data and/or instructions concerning a user. For example, a profile may comprise financial information of the user (e.g., credit information, debt information, asset information), demographic information of the user (e.g., age, sex, marital status, occupation, family size or composition), information retrieved from government records concerning the user (e.g., driving records, criminal records, security clearances, tax information), and information retrieved from corporate records regarding the user (e.g., job title, salary, benefits, performance reviews, computer access restrictions, purchase history). User profiles may further comprise data and/or instructions concerning an asset. For example, a profile may comprise information retrieved from government records and/or corporate records concerning an asset. Such information may concern the value or ownership of the asset (e.g., assessments or transaction records for real or personal property), or concern the condition of the asset (building permits, insurance claim information, vehicle history reports). A user profile may be stored on a non-transitory computer-readable medium.

As used herein, a "name" may comprise data and/or instructions stored in a non-transitory computer-readable medium. Such a name may represent at least one of a given name, middle name, or surname of an individual. One or more of the given name, middle name, or surname of the individual may be abbreviated. In some aspects, such a name may be represented as one or more character strings, which may be delimited, padded, and/or truncated as would be understood in the art. For example, a name may comprise the given name, middle initial, and surname of an individual delimited with whitespace characters. As another example, a name may comprise strings representing the given name, the middle name, and the surname of an individual. Each of these strings may have a predetermined width, and the given name, the middle name, and the surname may be padded or truncated to accommodate this width. As would be appreciated by one of skill in the art, there exists many ways of representing such names, and the above exemplary description is not intended to be limiting.

As used herein, "text message" may comprise an electronic message provided using either the Short Message Service (SMS) or Multimedia Messaging Service (MMS) protocols, or similar protocols.

As used herein, a "request" may comprise a text message, an email message (SMTP), a web request (HTTP), or similar communication. A request may be provided and/or received by a component of system 100. For example, a request may be provided by user device 110. As an additional example, a request may be received by profile generator 120. In certain aspects, a request may be provided using one protocol and received using another protocol. For example, a request may be provided as a text message, converted in transit, and then received as a web request. A request may comprise express information and intrinsic information.

As used herein, "express information" may comprise a payload of a request. In some aspects, express information may be included by the entity providing the message. For example, user device 110 may receive instructions from user 110a to include express information in a request. As a non-limiting example, express information may include a license plate number, address, name, or similar information. As would be recognized by one of skill in the art, express information may be provided in a variety of datatypes. As a non-limiting example, express information may be provided as text, an image, an object, or another datatype known to one of skill in the art.

As used herein, "intrinsic information" may comprise headers, metadata, or other information about the request, or provided to facilitate delivery of the request. For example, such intrinsic information may include the telephone number that provides the text message, the email address that provides the email message, the internet protocol address of the computing device that provides the web request, and/or similar proprietary identification information from a proprietary messaging platform (e.g., Facebook® Messenger, Whatsapp®, or similar platforms).

As used herein, "data source" may comprise a resource configured to provide information to one or more components of system 100. For example, data source may comprise an application programming interface (API), a source of messages in a publication and subscription framework, a network socket, a database, a data stream, or similar source of information known to one of skill in the art. The particular implementation of the data sources is not intended to be limiting. In some aspects, one or more components of system 100 may access a data source to retrieve information. Accessing the data source may comprise communicating with the resource to retrieve the desired information (e.g., providing a query message to the data source).

Consistent with disclosed embodiments, user device 110 may be used to communicate with other components of system 100. For example, user device 110 may be configured to provide a request to profile generator 120. The request may enable profile generator 120 to construct a profile. In some aspect, the profile generator 120 may be configured to determine at least one of express and intrinsic information from the request. This information may not identify the user. However, this information may be sufficient to identify the user in combination with information provided by the multiple distinct data sources. User device 110 may be configured to receive responses to the request. In some aspects, these responses may be queries for confirmation or for further information. These queries may be received from profile generator 120. For example, profile generator 120 may request confirmation of information received from the multiple distinct data sources. As an additional example, profile generator 120 may request further information required to create a profile. Similar queries may be received from service providers that have received the user profile directly or indirectly from profile generator 120. User device 110 may also be configured to receive results based on the provision of the user profile to one or more service providers. These results may be received directly from the service providers, or may be received indirectly through the profile generator. For example, profile generator 120 may collect these responses, and may provide a message indicating these collected responses to user device 110. For example, one or more comparative rating services may provide insurance quotes in response to a user profile provided by profile generator 120. These quotes may be provided directly to the user device 110, or may be provided to profile generator 120, and then included into a message provided to user device 110.

User device 110 may include, but is not limited to, a general purpose computer (e.g., a desktop or workstation), mainframe, or a mobile computing device. A mobile computing device may include, but is not limited to, a smartphone, game device, tablet, netbook, electronic reader, wearable display (e.g., electronic glasses), smart watch, personal digital assistant, and laptop. In some embodiments, user device 110 may be a client device of another component of system 100.

User 110a may be a person requesting generation of a user profile by system 100. User 110a may operate user device 110 to communicate with one or more components of system 100, consistent with disclosed embodiments. In some embodiments, user 110a may interact with user device 110 to request that profile generator 120 construct a profile. User 110a may operate user device 110 to receive responses to this request.

Data source 131 and data source 133 may constitute, at least in part, the multiple distinct data sources. These data sources may be configured to provide information including financial information of the user (e.g., credit information, debt information, asset information), demographic information of the user (e.g., age, sex, marital status, occupation, family size or composition), government records regarding the user (e.g., driving records, criminal records, security clearances, tax information), or corporate records regarding the user (e.g., job title, salary, benefits, performance reviews, computer access restrictions). The data sources may be associated with differing entities, as described above. In some embodiments, one or more of the data sources may include authorization requirements. For example, access to such a data source may be restricted to users with authorization. One or more of the data sources may include proprietary or confidential information, and access to such data sources may be restricted to customers. These restrictions may be imposed by the entities associated with the data sources. For example, data source 131 may be associated with entity 131a and data source 133 may be associated with entity 133a. Data source 131 may comprise proprietary information of entity 131a. Entity 131a may configure data source 131 to limit access to systems operated or controlled by other persons or entities. For example, these persons or entities may be constituents of entity 131a or customers of entity 131a. Access to data source 131 may be governed or allowed on the basis of agreements between entity 131a and the other persons or entities. In some aspects, entity 131a may similarly configure data source 131

In some embodiments, user 110a may lack authorization to access one or more of the multiple distinct data sources. For example, data source 131 may be operated by a reverse lookup service provider. The reverse lookup service provider may provide records associating communication information (e.g., phone numbers, email addresses, and/or name and zip code) to personal information (e.g., names and/or mailing addresses). The reverse lookup service provider may provide this information available to subscribers, and the user may not be a subscriber. However, profile generator 120 may be authorized to access data sources that user 110a is not authorized to access.

Profile generator 120 may be configured to generate profiles for users, such as user 110a, consistent with disclosed embodiments. In response to receiving a request from user device 110, profile generator 120 may be configured to access the multiple distinct data sources (e.g., data source 131 and data source 133). In some aspects, profile generator 120 may include credentials 123. Profile generator 120 may be configured to rely upon these credentials when accessing the multiple distinct data sources. In some aspects, profile generator 120 may include access templates 121. Profile generator 120 may be configured to retrieve information from the multiple distinct data sources according to access templates 121. In some aspects, profile generator 120 may include identification rules 125. Profile generator 120 may be configured to identify and/or authenticate user 110a by applying one or more of identification rules 125 to data retrieved from the multiple distinct data sources. Based on the results of this identification and/or authentication, profile generator 120 may be configured to create a profile for user 110a. In some aspects, profile generator 120 may be configured to provide a request to user device 110 for confirmation of the user profile. Profile generator 120 may be configured to provide the user profile to a service provider system. This service provider system may be distinct from profile generator 120.

Profile generator 120 may comprise one or more computing systems configured to execute software instructions stored on at least one non-transitory computer-readable medium to perform one or more operations consistent with the disclosed embodiments. For example, profile generator 120 may include one or more memory device(s) storing data and software instructions and one or more processor(s) configured to use the data and execute the software instructions to perform server-based functions and operations known to those skilled in the art. Profile generator 120 may include one or more computers, workstations, servers, or networked collections of servers, consistent with disclosed embodiments. Profile generator 120 may be standalone, or it may be part of a subsystem, which may be part of an enterprise system associated with an entity. For example, profile generator 120 may comprise a component of an enterprise resource planning system of the entity.

Access templates 121 may comprise data and/or instructions stored in one or more non-transitory computer-readable media, consistent with disclosed embodiments. Access templates 121 may include data and/or instructions for specifying an access order for data sources, for accessing the data sources, and for formatting and cleaning the retrieved data. Access templates 121 may therefore enable profile generator 120 to generate a set of data for authenticating or identifying the user, and for potentially including in the user profile.

Access templates 121 may specify an order for accessing the multiple distinct data sources, consistent with disclosed embodiments. As described below with regards to FIG. 3, this order may enable profile generator 120 to use previously retrieved information to generate keys for subsequent information retrieval. In some aspects, this order may be predetermined. For example, profile generator 120 may be configured to access the multiple distinct data sources according to a predetermined dependency graph. In various aspects, this order may be determined at run-time based on the information derived from the request and/or the previously accessed data sources. For example, profile generator 120 may be configured to construct a dependency graph based on the information derived from the request. This dependency graph may be updated as information is retrieved from data sources. For example, when profile generator 120 fails to retrieve the intended information from a data source, another data source providing this information may be added to the dependency graph. In this manner, beginning with the items of information derived from the request, profile generator 120 may be configured to use previously retrieved items to retrieve subsequent items.

Access templates 121 may include data and/or instructions for accessing the data sources, consistent with disclosed embodiments. In some aspects, access templates 121 may comprise Application Programming Interface (API) information for accessing each of the multiple distinct data sources. In various aspects, data source 131 may be accessible through a web service, and access templates 121 may include configuration information enabling profile generator 120 to access that web service. As a non-limiting example, access templates 121 may include a Web Service Definition Language (WSDL) document describing the web service.

Access templates 121 may include data and/or instructions for formatting the data retrieved from the data source, consistent with disclosed embodiments. For example, a date may be retrieved from data source 131 as the number of days since Jan. 1, 1970, while another date may be retrieved as a text string. As an additional example, another data source may provide objects including multiple values. Some of these values may not be relevant, and therefore may not be selected for potential inclusion in the user profile. For example, a data source may provide records including a customer address and a customer number specific to the data source. Profile generator 120 may be configured according to access templates 121 to only select the customer address for potential inclusion in the user profile.

Access templates 121 may include the data and/or instructions necessary for cleaning the data retrieved from the data source, consistent with disclosed embodiments. For example, when the data retrieved is an address, profile generator 120 may be configured according to access templates 121 to identify erroneous data (e.g., "$3^{rd}$ sreer") and replace it with correct data (e.g., "$3^{rd}$ street"). In some aspects, cleaning the data retrieved from the data source may comprise providing the retrieved data to an external cleaning service. For example, profile generator 120 may be configured according to access templates 121 to use the United States Postal Service (USPS) Address Standardization Web Tool, or a similar tool, to clean retrieved address data.

Credentials 123 may comprise data and/or instructions stored on one or more a non-transitory computer-readable media. In some aspects the credentials may comprise authentication and authorization information for accessing the data sources. For example, credentials 123 may include login information for data source 131. This login information may or may not be shared with data source 133. In some aspects, credentials 123 may be provided by entities associated with the multiple distinct data sources, such as entities 131*a* and 133*a*. Profile generator 120 may be configured to retrieve any appropriate credentials from credentials 123 and provide them as required when attempting to access a data source. In some aspects, credentials 123 may be specific to profile generator 120, and may authenticate profile generator 120. In various aspects, user device 110 and user 110*a* may lack at least some of credentials 123.

Identification rules 125 may comprise data and/or instructions stored in one or more a non-transitory computer-readable media. In some aspects, identification rules 125 may describe how the information retrieved by profile generator 120 is used to identify and/or authenticate user 110*a*. For example, profile generator 120 may retrieve multiple different versions of the same information, such as an address. In some cases this may be due to differences in the age of the data between data sources. For example, one data source may provide an outdated address for the user. In other cases, this may be due to errors in data entry. For example, one data source may erroneously provide the address of another individual. In resolving differences between data, identification rules 125 may privilege certain items of information over others. The relative privilege of items of information may depend on the source of the information. Sources of information considered more likely to be accurate may be privileged over sources of information considered to be less likely to be accurate. For example, address information retrieved from motor vehicle records may be privileged over address information retrieved from a credit card information data source. The relative privilege of items of information may depend on the recency of the information. More recent information may be privileged over older information. The relative privilege of items of information may depend on the amount of confirmation of the information. For example, the more sources of information that provide the same address, the more likely that address is an accurate address for the user. Thus that address value may be privileged over other address values. In some embodiments, profile generator 120 may be configured to determine the most privileged value for each component of the user profile. For example, profile generator 120 may be configured to determine the most privileged name, address, salary, date-of-birth, etc.

In some embodiments, profile generator 120 may be configured to derive multiple items of information from the request received from user device 110. These items of information may be used to retrieve other items of information. In this manner, each retrieved item of information may ultimately depend upon one or more of the items of information derived from the request received from user device 110. For example, profile generator 120 may be configured to derive a phone number and email address from the request. Profile generator 120 may be configured to retrieve a name ("Name A") and address ("Address A") using the phone number. Profile generator 120 may also be configured to retrieve another name ("Name B") and another address ("Address B") using the email address. In some embodiments, profile generator 120 may be configured to compare such items of information according to identification rules 125. For example, according to the identification rules 125, the Name A may be compared to Name B, and the Address A may be compared to Address B. Profile generator 120 may be configured to determine that these items of information match when they are sufficiently similar. Such similarity may depend on the type of data. For example, numerical values differing by less than a certain amount or percentage may be sufficiently similar. Likewise, a measure of distance between two string values may be determined according to known methods, such as a Jaro-Winkler distance, Damerau-Levenshtein distance, Hamming distance, or a similar metric.

Based on such comparisons, according to the identification rules 125, profile generator 120 may be configured to authenticate user 110. For example, profile generator 120 may be configured to determine a degree to which information obtained using differing information derived from the request match. For example, profile generator 120 may determine the number of matching items. This number could be weighted to account for the relative importance of different items of information. Should this number exceed a threshold, the profile generator 120 may be configured to assume that the individual identified by the retrieved items of information is the individual that provided the request (i.e., user 110). To continue the above example, when the Name A and Address A obtained using the phone number matches the Name B and Address B obtained using the email address, profile generator 120 may be configured to assume that the individual having Name A and Address A is the individual that provided the request. Alternatively, when the number falls below a threshold, profile generator 120 may be configured to assume that different individuals are associated with the different items of information derived from the request.

In some embodiments, before performing such comparisons, profile generator 120 may be configured to select the most privileged values among those values obtained using each item of information derived from the request. To continue the above example, profile generator 120 may be configured to retrieve another name ("Name C") and another address ("Address C") using the phone number. Applying identification rules 125, profile generator 120 may determine that the Name A is more privileged than Name C, and Address C is more privileged than Address A. Profile generator 120 may be configured to compare Name A to Name B and Address C to Address B, according to identification rules 125.

Identification rules 125 may include rules for creating a user profile when different individuals are associated with the different items of information derived from the request. In some embodiments, profile generator 120 may be configured to generate a user profile by combining items of information retrieved using the different items of information derived from the request. To continue the above example, profile generator 120 may additionally derive a license plate number from the request. Profile generator 120 may be configure to retrieve a vehicle year, make, model, and trim using, at least in part, the license plate number. Profile generator 120 may be configured to additionally retrieve a date-of-birth using the phone number. Using, at least in part, the Name A, Address A, and date-of-birth, profile generator 120 may be configured to additionally retrieve motor vehicle records, financial records, credit records, and/or similar information. When profile generator 120 determines different individuals are associated with the different items of information derived from the request, profile generator 120 may be configured to create a user profile comprising the vehicle year, make, model, and trim obtained using the license plate number, and Name A, Address A, date-of-birth, and motor vehicle record information obtained using the phone number. Alternatively, profile generator 120 may be configured to provide a response to user device 110 indicating a failure to authenticate the user.

Network 140 may be configured to provide communications between components of FIG. 1. For example, network 140 may be any type of network (including infrastructure) that provides communications, exchanges information, and/or facilitates the exchange of information, such as the Internet, a Local Area Network, a cellular phone network, public switched telephone network (PSTN), or other suitable connection(s) that enables system 100 to send and receive information between the components of system 100.

Figure 2:
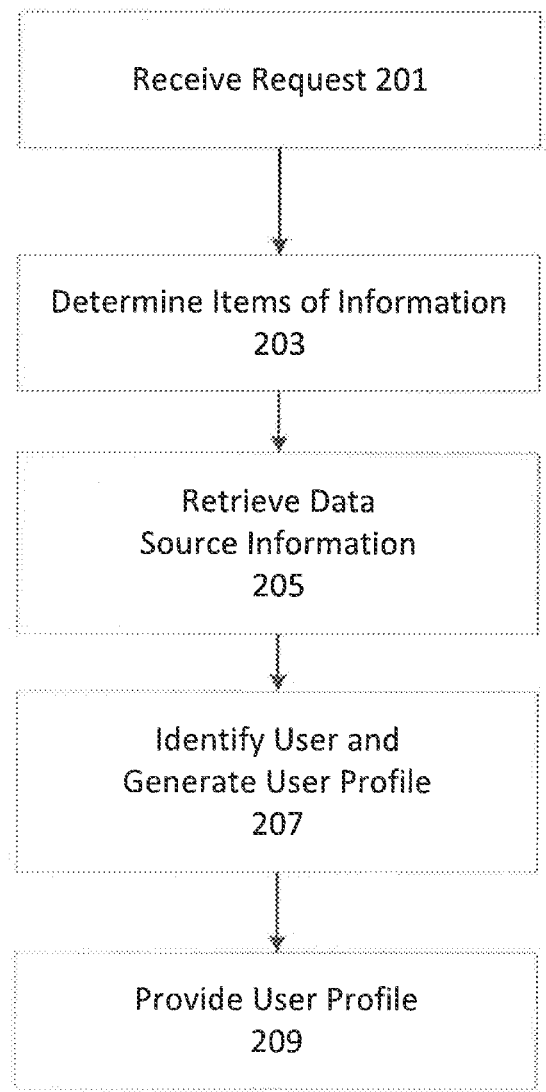
FIG. 2 depicts a flowchart of an exemplary method for generating a user profile.

FIG. 2 depicts a flowchart of an exemplary method for generating a user profile, consistent with disclosed embodiments. The exemplary method may include the steps of receiving a request, determining items of information from the request, retrieving information from the multiple distinct data sources based on the request, identifying the user and generating the user profile, and providing the user profile to a consumer of the profile. As a non-limiting example, such a consumer may include a personalized service (e.g., a recommendation system, social networking system, or peer-to-peer marketplace), a human-resources system, an enrollment-management system, or a rating system (e.g., a comparative rating system, an insurance quoting system, or mortgage quoting system). As would be appreciated by one of skill in the art, the disclosed sequence of steps is not intended to be limiting. Additional steps may be added or removed, or existing steps combined or divided, without departing from the envisioned subject matter.

Profile generator may be configured to receive a request in step 201, consistent with disclosed embodiments. The request may be received from user device 110. In some aspects, the request may include items of express information. As described above, such information may have been included in the request by user 110*a*. This information may be included in the form of text or images. For example, a user may send a text message including a picture of a license plate number, or identification card (e.g., a driver's license). In some embodiments, this may be publicly available information. In some aspects, the request may include items of intrinsic information. For example, the request may intrinsically indicate a phone number, email address, IP address, or similar items of intrinsic information.

Profile generator 120 may be configured to determine items of information in step 203, consistent with disclosed embodiments. In some aspects, determining the items of information may include extracting the information from an image. For example, profile generator may be configured to apply an optical character recognition program to the image. This optical character recognition program may be general purpose, or may be specific to a type of data. For example, profile generator 120 may be configured to use a license plate reader (e.g., OpenALPR, OpenCV, Platesmart, or similar software) to determine the license plate number from an image of a license plate. Such a license plate reader may also be configured to determine the state of the license plate. Profile generator 120 may be configured to execute the license plate reader, or may be configured to provide the image to another system that executes the license plate reader. Then profile generator 120 may be configured to receive the extracted information (e.g., license plate number, state) in response. In various aspects, determining items of information from the request may comprise extracting the communication channel information from the request. For example, profile generator 120 may be configured to extract a phone number from a text message or an email address from an email. As would be recognized by one of skill in the art, these items of information would be associated with different entities. For example, the license plate information would be associated with the state in which the vehicle was registered, while the phone number would be associated with the company providing the phone service. In this manner, multiple items of information associated with distinct entities may be determined from the request. In some embodiments, these items of information may be publicly available, as described above.

Profile generator 120 may be configured to retrieve data source information in step 205, consistent with disclosed embodiments. This retrieval process is described in greater detail with regards to FIG. 3. In some embodiments, profile generator 120 may be configured with credentials (e.g., credentials 123) for one or more of the multiple distinct data sources. Profile generator 120 may be configured to use these credentials to access these data sources. For example, profile generator 120 may be configured to provide these credentials during a login process for the accessing of these data sources. The credentials may be shared between one or more of the distinct data sources, or may differ between data sources. The profile generator may be configured to access the multiple distinct data sources according to access templates 121. In particular, profile generator 120 may be configured to access the multiple distinct data sources in a specified order to retrieve additional information. This specified order may be predetermined, or may be determined at run-time based on the information received from the request and/or the previously accessed data sources. As used herein, additional information comprises the information retrieved by profile generator 120 beyond the information determined from the request.

Profile generator 120 may be configured to identify the user and generate the user profile in step 207, consistent with disclosed embodiments. In some embodiments, profile generator 120 may be configured to apply identification rules 125 to the additional data to identify the user. In some aspects, this identification may also use the items of information determined from the request. Profile generator 120 may be configured to reconcile differing items of information. This reconciliation may include determining privilege levels for differing retrieved values of components of the user profile. Profile generator 120 may be configured to select the value with the highest privilege value for the user profile. In some aspects, profile generator 120 may be configured to identify these items of the additional information as being associated with the user providing the request (e.g., user 110*a*).

In some aspects, profile generator 120 may be configured to authenticate the user based on the additional information. For example profile generator 120 may be configured to determine privilege levels for differing retrieved values of components of the user profile corresponding to each of the items of information determined from the request. Profile generator 120 may be configured to authenticate the user by comparing items of the additional information obtained using differing combinations of one or more items of information determined from the request. For example profile generator 120 may be configured to match a first item of the additional information retrieved using a first item of information derived from the request with a second item of the additional information retrieved using a second item of information derived from the request. In some embodiments, for at least some of the components of the user profile and at least some combinations of one or more items of information derived from the request, the items of information compared may be the highest privilege items of information.

Profile generator 120 may be configured to authenticate the user based on the outcome of the comparisons. For example, if a metric based on the number of matches exceeds a threshold, then profile generator 120 may be configured to assume the identified user is the user that provided the request. As would be recognized by one of skill in the art, other criteria for evaluating consistency between items of additional information retrieved using differing combinations of one or more items of information determined from the request may be used. The above method is therefore not intended to be limiting. In some embodiments, profile generator 120 may also be configured to identify items of information associated with another user. For example when the items of information determined from the request are associated with different users, the items of additional information obtained using the differing combinations of these items of information may be identified with different users.

Profile generator 120 may also be configured to generate the user profile in step 207, consistent with disclosed embodiments. In some embodiments the user profile may comprise data or instructions stored in one or more non-transitory computer-readable media. Profile generator 120 may be configured to select items of the additional information for inclusion in the user profile. For example, when a user is authenticated, the user may be associated with one or more items of information derived from the request. Generating the user profile may include storing in the user profile at least some of the additional information obtained using these items of information. In some aspects, generating the user profile may include storing in the user profile at least some of the additional information obtained using other items of information not associated with the authenticated user.

Profile generator 120 may be configured to provide the user profile in step 209, consistent with disclosed embodiments. In some embodiments, the user profile may be provided to one or more consumers of user profiles. These consumers of user profiles may be service providers, configured to use the user profile to determine personalized services for the user. These consumers may include user device 110.

Figure 3:
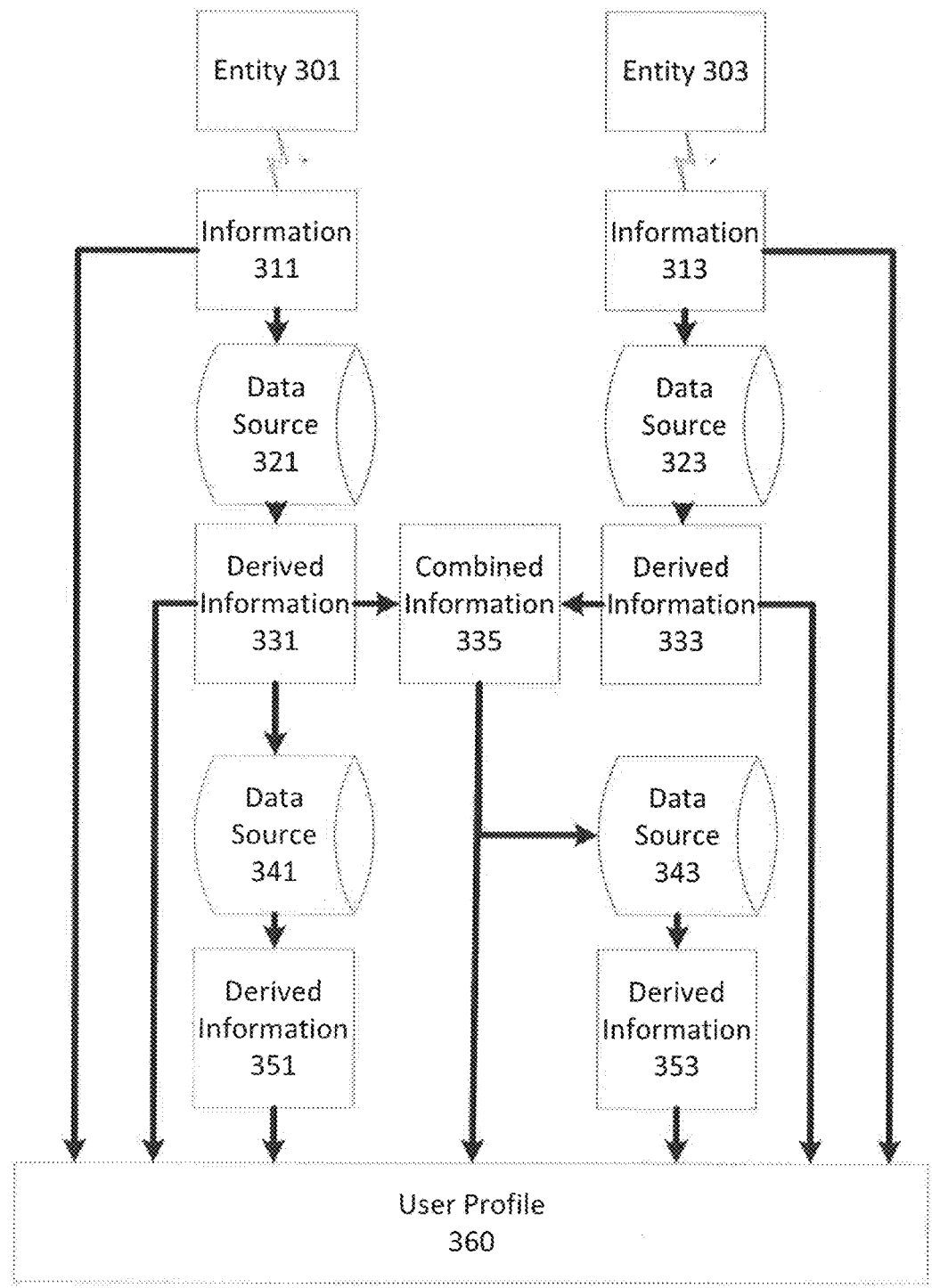
FIG. 3 depicts a flowchart of an exemplary method for retrieving additional information from multiple distinct data sources.

FIG. 3 depicts a flowchart of an exemplary method for retrieving additional information from multiple distinct data sources. As depicted in FIG. 3, profile generation system 120 may be configured to sequentially access the multiple distinct data sources to generate a user profile. In some aspects, information 311 may be associated with entity 301. For example, information 311 may comprise a phone number and entity 301 may comprise a telephone service provider. Data source 321 may be associated with another entity distinct from entity 301. For example, while entity 301 may be a telephone service provider, the entity operating or controlling data source 321 may be, as a non-limiting example, a reverse look-up service. Profile generator 120 may be configured to use information 311 to retrieve one or more items of additional information from data source 321. For example, data source 321 may accept queries referencing a key field, and information 311 may comprise a value of this key field. Profile generator 120 may be configured to retrieve the entire record associated with information 311, or only a portion of the information. For example, profile generator 120 may be configured to retrieve derived information 331.

In some embodiments, profile generator 120 may be configured to use information 311 to retrieve one or more items of additional information from data source 323. For example, data source 323 may accept queries referencing a key field, and information 313 may comprise a value of this key field. In some aspects, information 313 may be associated with entity 303. For example, information 313 may comprise a license plate number and entity 303 may be a state department of motor vehicles. Data source 323 may be associated with another entity distinct from entity 303. For example, while entity 303 may be a state department of motor vehicles, the entity operating or controlling data source 321 may be, as a non-limiting example, a credit reporting agency. Profile generator 120 may be configured to retrieve the entire record associated with information 313, or only a portion of the record. For example, profile generator 120 may be configured to retrieve derived information 333.

In some embodiments, profile generator 120 may be configured to use derived information 331 to retrieve one or more items of additional information from data source 341. For example, derived information 331 may comprise a foreign key usable with data source 341. Additionally or alternatively, derived information 331 may be used to derive a key usable with data source 341. As a non-limiting example, derived information 331 may comprise the name, address, or identification number of the user 110. Profile generator 120 may be configured to retrieve the entire record associated with derived information 331, or only a portion of the record. For example, profile generator 120 may be configured to retrieve derived information 351.

In some embodiments, profile generator 120 may be configured to use derived information 333 to retrieve one or more items of additional information from data source 343. For example, derived information 333 may be used to derive a key usable with data source 343. As an additional example, profile generator may combine derived information 331 with derived information 333 to generate combined information 335. Combined information 335 may comprise a key usable with data source 343. For example, when derived information 331 comprises name, date of birth, and address, derived information 333 may comprise vehicle identification number. The combined information 335 may then comprise name, date of birth, address, and VIN. This may comprise a key into a database of motor vehicle records. Alternatively or additionally, derived information 333 may comprise a foreign key (not shown) usable with data source 343. Profile generator 120 may be configured to retrieve the entire record associated with combined information 335, or only a portion of the record. For example, profile generator 120 may be configured to retrieve derived information 353.

In some embodiments, profile generator 120 may be configured to process the additional information retrieved from the multiple distinct data sources according to identification rules 125. In some aspects, profile generator 120 create user profile 360 from the information determined from the request, and from the additional information obtained using the information derived from the request.

Figure 4:
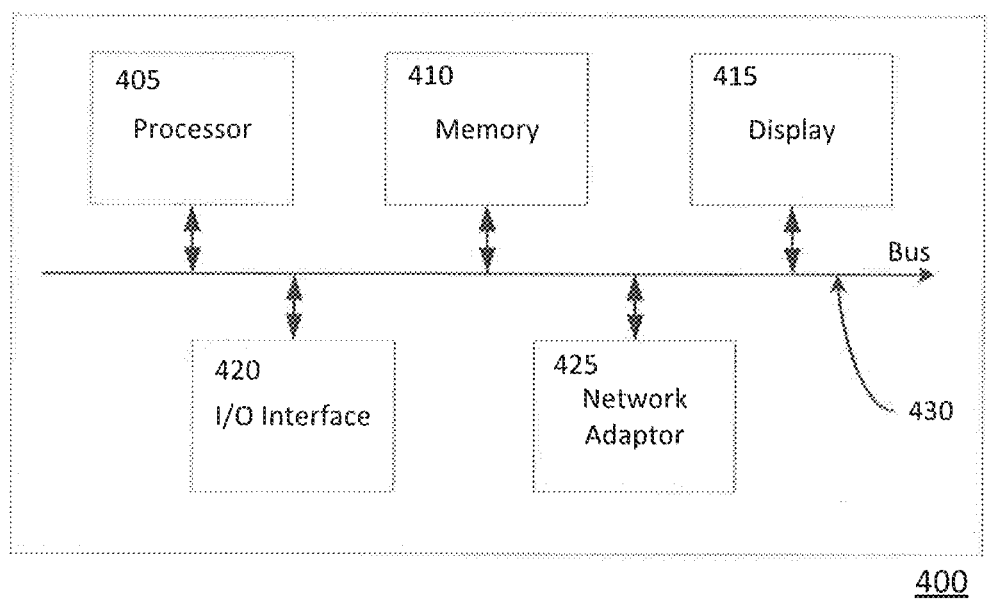
FIG. 4 depicts a schematic of an exemplary computing device for generating a user profile.

FIG. 4 depicts a block diagram illustrating such an exemplary computing device 400. In some embodiments, computing device 400 includes a processor 405, memory 410, display 415, Input/Output interface(s) 420, and network adapter 425. These units may communicate with each other via bus 430, or wirelessly. The components shown in FIG. 4 may reside in a single device or multiple devices. For example, the components shown in FIG. 4 may comprise a component of a cloud computing platform, such as, for example, the platforms provided by Amazon web Services®, Microsoft Azure®, or Google Cloud Platform™. Such a cloud computing platform may be configured with one or more virtual machines, and may provide management systems for controlling the operation of the virtual machines. The cloud computing platform may be configured to provide platform services to the virtual machines hosted on the platform.

Consistent with disclosed embodiments, processor 405 may be a microprocessor or a central processing unit (CPU) having one or more cores. Computing device 400 may include one or more processors 405 and may further operate with one or more other processors that are remote with respect to processors 405. Memory 410 may include one or more non-transitory computer-readable media containing non-transitory instructions, such as a computer hard disk, random access memory (RAM), removable storage, or remote computer storage. In some aspects, memory 410 may be configured to store software programs. In some aspects, processor 405 may be configured to execute non-transitory instructions and/or programs stored on memory 410 to configure computing device 400 to perform operations of the disclosed systems and methods. In various aspects, as would be recognized by one of skill in the art, processor 405 may be configured to execute non-transitory instructions and/or programs stored on a remote memory to perform operations of the disclosed systems and methods.

Optional display 415 may be any device which provides a visual output, for example, a computer monitor, a Liquid Crystal Display (LCD) screen, etc. Input/Output interfaces 420 may include hardware and/or a combination of hardware and software for communicating information to computing device 400 from a user of computing device 400, such as a keyboard, mouse, trackball, audio input device, touch screen, infrared input interface, or similar device. Network adapter 425 may include hardware and/or a combination of hardware and software for enabling computing device 400 to exchange information with external networks. For example, network adapter 425 may include a wireless wide area network (WWAN) adapter, a Bluetooth module, a near field communication module, or a local area network (LAN) adapter.

Exemplary Application: Generating User Profiles for Insurance Quotes

Figure 5:
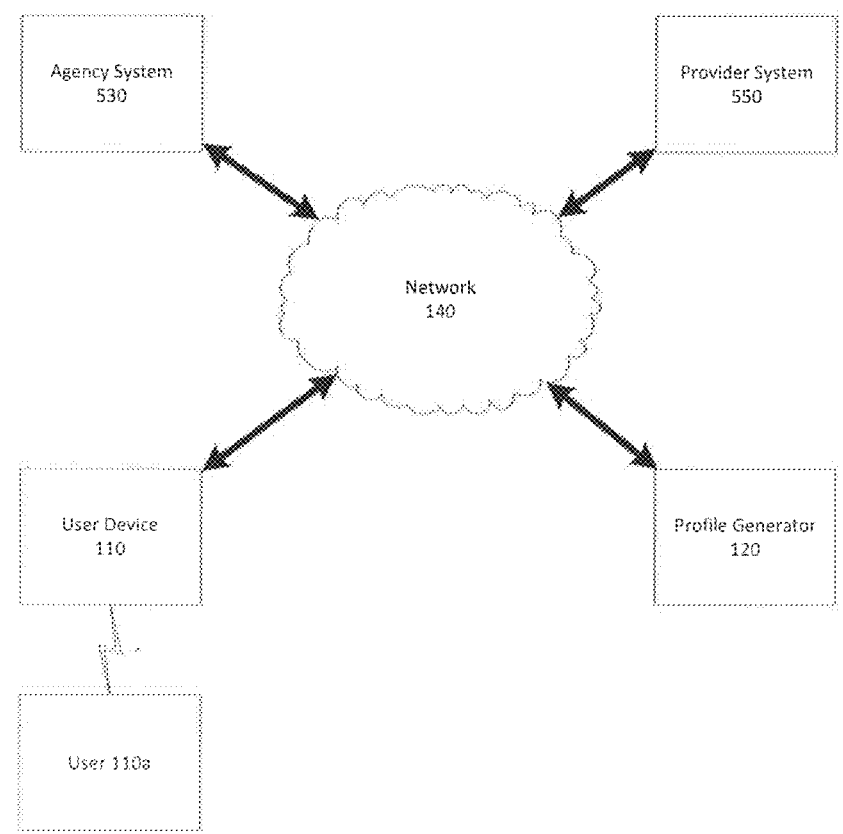
FIG. 5 depicts an exemplary system that generates user profiles and provides the user profiles to multiple consumers of user profiles.

The envisioned embodiments have been described with regards to a profile generator 120 of general applicability. This profile generator improves upon previous architectures by increasing the efficiency with which user profiles may be created, while reducing the likelihood of error. This architecture may optionally authenticate the user during creation of the user profile by comparing information generated using different items of information derived from the user's request to generate the profile. FIG. 5 depicts an exemplary system that generates user profiles and provides the user profiles to service providers. In this example the service providers comprise agency system 530 and provider system 550.

Agency system 530 may comprise one or more agency management systems that connects users seeking insurance quotes with insurance agencies. Non-limiting examples of such an agency system include EZLynx®, Blitz, Velocify®, Vertafore AIM™, and Microsoft Dynamics™. Profile generator 120 may be configured to communicate with these agency management systems using a Remote Procedure Call service, REST (JSON-based), SOAP (XML-based) web services framework, or other similar communication protocol. As part of this communication, profile generator 120 may be configured to transform the user profile into a suitable format of consumption by the agency management system.

Provider system 550 may comprise one or more comparative rater systems that consume a user profile and return insurance quotes for multiple different policies. Non-limiting examples of such comparative rater systems include ITC TurboRater®, EZLynx®, and Vertafore PL Rater. Profile generator 120 may be configured to communicate with these comparative rater systems using the ACORD electronic data standard, the EZAuto standard, of the TT2 standard. As part of this communication, profile generator 120 may be configured to transform the user profile into a suitable format for consumption by the comparative rater systems.

Consistent with disclosed embodiments, profile generator 120 may be configured to receive a request provided through a messaging platform (not shown). The messaging platform may enable the user device 110 provide requests to profile generator 120 in the form of a text message or iMessage. These message platforms typically provide messages consisting primarily of text, and optionally containing file attachments, such as images or video. These messages may be sent globally to other devices or systems. As would be recognized by one of skill in the art, SMS is supported by Global System for Mobile communication (GSM) and other mobile communications systems, while other messaging services, such as iMessage, are supported by various protocols, typically consisting of a proprietary application program interface made accessible via Transmission Control Protocol/Internet Protocol (TCP/IP). SMS Messages in particular may also be transmitted to or from an application: 1) connected to a Short Message Service Center or SMS Aggregator, and equipped using a Direct-to-SMSC Gateway software, 2) using a GSM Gateway Appliance, which is a direct-to-mobile gateway, with built in wireless GSM connectivity, or 3) using an email, SMS message, or iMessage. Direct-to-SMS Gateways may provide SMS transmission and reception services via an API, such as Clickatell, Twilio, Esendex, CallFire, and others. Proprietary TCP/IP based Messaging Platforms may also allow the transmission of Messages to or from an application using an API, as specified by said Messaging Platform. The aforementioned direct-to-SMSC Gateways, GSM Gateway Appliances, direct-to-SMS Gateways, SMS Messaging Services, and Messaging Platform APIs each comprise a messaging interface. Profile generator 120 may be configured to communicate with the messaging platform using the message interface.

Consistent with disclosed embodiments, an exemplary user profile suitable for consumption by automobile insurance service providers may include personal data of a user, vehicle data, motor vehicle records, and/or credit rating. The vehicle data may include either the Vehicle Identification Number (VIN) of the year, make, model, and trim of the vehicle to be insured. The location (address or zip code) where the vehicle will be "garaged" (primarily stored when not being driven), 3) the age and gender of the driver(s), 4) the Motor Vehicle Record (MVR) of the driver(s), and sometimes 5) the Credit Rating of the driver(s) may also be components of the user profile.

As described above, the items of information may be included in the request. In addition, items of information may be derived from the request, such as characteristics of the communication channel used to provide the request. In this exemplary application, these items of information may include data identifying a vehicle, a driver, or an insurance policy. For example, this data may include at least some of an image of a license plate, a license plate number (an alphanumeric identifier) and a state of issuance a driver's license number (an alphanumeric identifier) and state of issuance, and a VIN number.

As described above, profile generator 120 may be configured to access the multiple distinct data sources according to a specified order. In this exemplary application, profile generator 120 may be configured to access data sources as described below to retrieve the additional information for the user profile. The request may comprise an image or text of the license plate number. When the request comprises an image, profile generator may extract the license plate number and state using optical character recognition. The phone number may be derived from the communication channel information, for example using a caller identification application or extracting the email address. Profile generator 120 may be configured to access a reverse lookup data source (e.g., Whitepages) to retrieve name, date-of-birth, and address information using the email address or phone number. Profile generator 120 may be configured to access a vehicle history report (e.g., Experian, CarFax, Edmunds) using the license plate number and state to retrieve the vehicle identifier number, year, make, model, and trim of the vehicle. Profile generator 120 may be configured to use the name, date of birth, address, and VIN to retrieve MVRs from one or more data providers (e.g. TransUnion DriverRisk). In some embodiments, profile generator may require a driver's license number to retrieve this information. The driver's license number may be including the request, for example as a text string or an image. Profile generator 120 may be configured to use the name, date of birth, and address to retrieve a credit score from a credit bureau. The credit score may be an estimated credit score. Profile generator 120 may be configured to use the address to retrieve a property value from one or more real-estate listing services (e.g., Zillow GetZestimate API, Multiple Listing Services, SimplyRETS, and similar services). Profile generator 120 may also be configured to receive government tax data, such as real estate tax roll data provided by county governments. This data may include at least one of current property owner, purchase date, purchase price, assessed value, and property owner's mailing address (if different from the property address). This government tax data may be provided intermittently. For example, county tax data may change monthly, and must be updated monthly via flat file. Such updates may include bulk records (e.g., using a physical medium, File Transfer Protocol (FTP) server, or web service). Additionally or alternatively, such records may be provided in response to an electronic request (e.g., using an API or a web service). Profile generator 120 may be configured to use name to retrieve education, occupation, and industry from a social media provider (e.g., LinkedIn API, Facebook Graph API). In some embodiments, profile generator 120 may be configured to select a record based on a scoring criterion. The score may be generated based on date of birth and address. For example, profile generator 120 may estimate the age of the person in the record based on educational milestones, and compare that age to the age retrieved from other records to calculate the score. As an additional example, profile generator 120 may estimate the location of the person in the record based on the location of the current employer, and compare this location to the address retrieved from other records to calculate the score. In this manner profile system 120 may generate a user profile by repeatedly querying multiple distinct data sources and using the responses to generate subsequent queries.

Figure 6A:
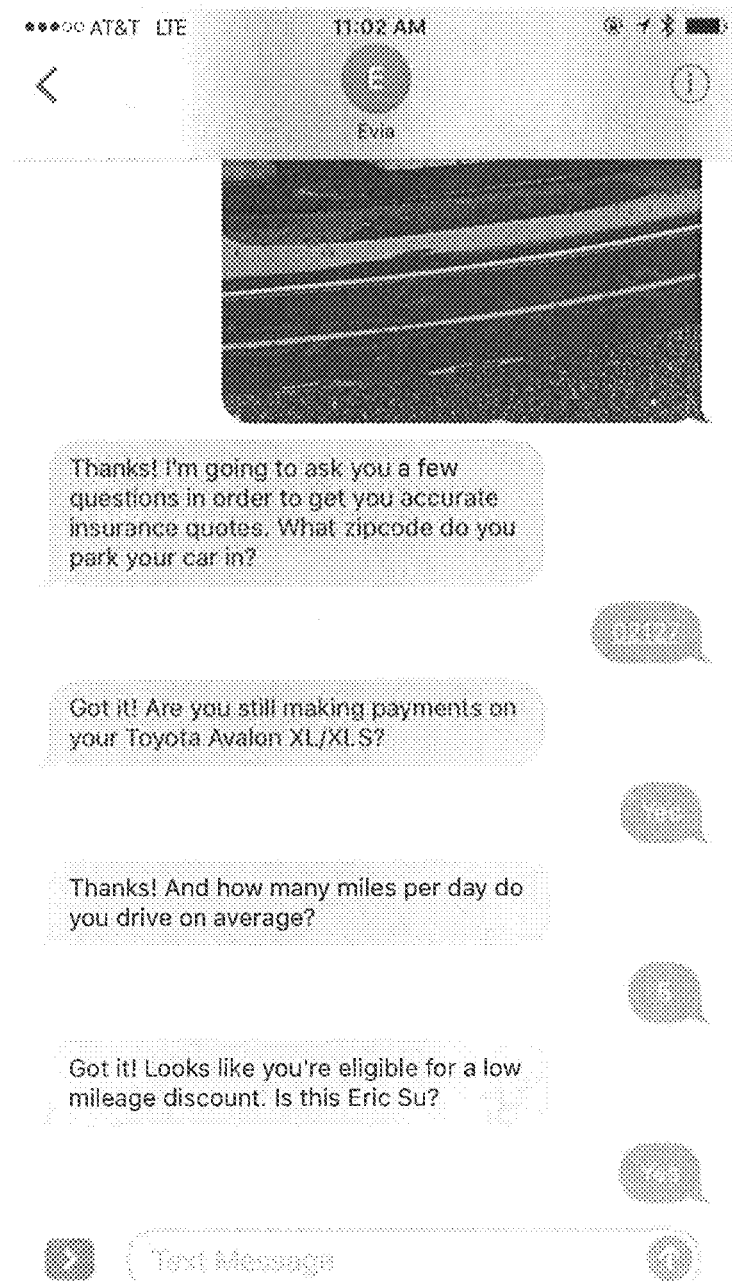
FIGS. 6A-6C depict a user interface for generating a user profile.
Figure 6B:
Figure 6C:
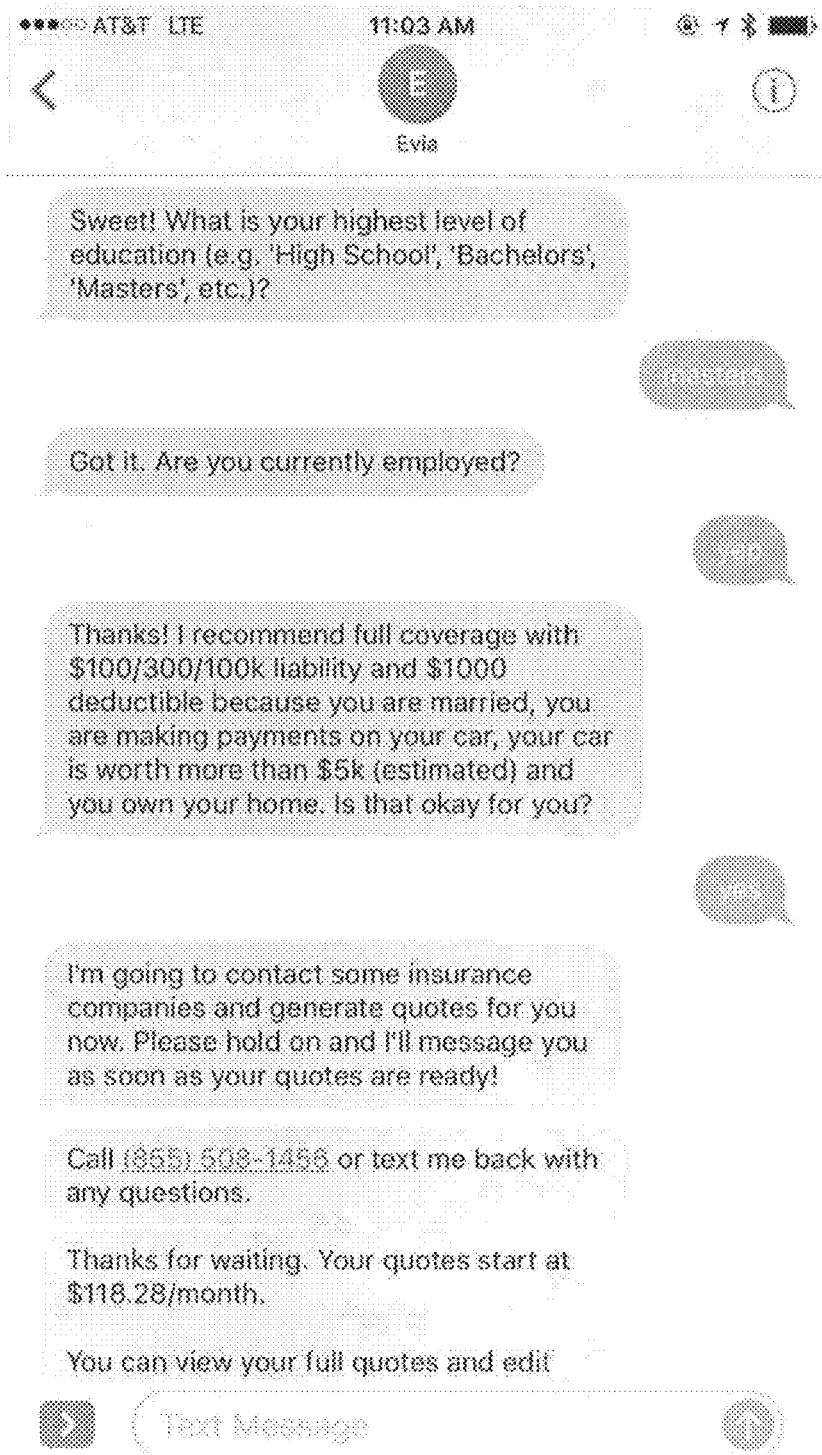

As described above, a request provided by user device 110 initiates the profile generation process. Furthermore, during this process, profile system 120 may determine that the information retrieved may be inaccurate, or may determine that the user profile requires additional information. FIGS. 6A-6C depict a user interface for generating a user profile. As depicted, the profile generation process may begin with the user providing an image of a license plate to profile generating device 120. Profile generating device 120 may automatically respond. For example, profile generating device 120 may automatically make additional requests to confirm information, to provide information, and/or to confirm the identity of the user.

The foregoing disclosed embodiments have been presented for purposes of illustration only. This disclosure is not exhaustive and does not limit the claimed subject matter to the precise embodiments disclosed. Those skilled in the art will appreciate from the foregoing description that modifications and variations are possible in light of the above teachings or may be acquired from practicing the inventions. In some aspects, methods consistent with disclosed embodiments may exclude disclosed method steps, or may vary the disclosed sequence of method steps or the disclosed degree of separation between method steps. For example, method steps may be omitted, repeated, or combined, as necessary, to achieve the same or similar objectives. In various aspects, non-transitory computer-readable media may store instructions for performing methods consistent with disclosed embodiments that exclude disclosed method steps, or vary the disclosed sequence of method steps or disclosed degree of separation between method steps. For example, non-transitory computer-readable media may store instructions for performing methods consistent with disclosed embodiments that omit, repeat, or combine, as necessary, method steps to achieve the same or similar objectives. In certain aspects, systems need not necessarily include every disclosed part, and may include other undisclosed parts. For example, systems may omit, repeat, or combine, as necessary, parts to achieve the same or similar objectives. Accordingly, the claimed subject matter is not limited to the disclosed embodiments, but instead defined by the appended claims in light of their full scope of equivalents.

What is claimed is:

1. A system for authenticating a user, comprising:
   at least one processor; and
   at least one non-transitory computer-readable media storing instructions that, when executed by the at least one processor, cause the system to perform operations comprising:

receiving, from a device of a user, a request to generate a user profile, determining, from the request, first information associated with a first entity and second information associated with a second entity distinct from the first entity, accessing, using credentials of the system, multiple distinct data sources in a specified order to retrieve additional information, accessing comprising:

accessing a first one of the multiple distinct data sources to retrieve a first item of the additional information using the first information, accessing a second one of the multiple distinct data sources to retrieve a second item of the additional information using the second information, and authenticating the user based on the additional information, and generating a user profile based in part on the additional information.

2. The system of claim 1, the operations further comprising providing the user profile to another system distinct from the system for authenticating the user.

3. The system of claim 1, wherein accessing multiple distinct data sources in a specified order further comprises accessing a third one of the multiple distinct data sources to retrieve a third item of the additional information using the first item of the additional information or the second item of the additional information.

4. The system of claim 3, wherein the first item of the additional information or the second item of the additional information comprises a foreign key value for the third one of the multiple distinct data sources.

5. The system of claim 1, wherein accessing multiple distinct data sources in a specified order further comprises accessing a fourth one of the multiple distinct data sources to retrieve a fourth item of the additional information using a fourth item of information derived from the first item of the additional information and the second item of additional information.

6. The system of claim 5, wherein the fourth item of information comprises a key value for the fourth one of the multiple distinct data sources.

7. The system of claim 1, wherein accessing the multiple distinct data sources in the specified order enables the system to use previously retrieved information to generate keys for subsequent information retrieval.

8. The system of claim 1, wherein the request comprises an image, and wherein determining the first information comprises extracting the first information from the image.

9. The system of claim 1, wherein the first information comprises publicly available information.

10. The system of claim 1, wherein the second information comprises intrinsic information.

11. The system of claim 1, wherein authenticating the user based on the additional information comprises identifying an item of the additional information associated with the user and identifying an item of the additional information associated with another user.

12. The system of claim 11, wherein the user profile comprises the identified item of the additional information associated with the other user.

13. The system of claim 1, wherein authenticating the user based on the additional information comprises determining whether an item of the additional information retrieved using the first information matches an item of the additional information retrieved using the second information.

14. The system of claim 13, wherein the item of the additional information retrieved using the first information comprises a name, sex, address, date of birth, or identification number of the user.

15. The system of claim 1, wherein authenticating the user based on the additional information further comprises providing, to the device of the user, a request to confirm an item of the additional information.

16. The system of claim 1, wherein authenticating the user based on the additional information further comprises providing, to the device of the user, a request to provide further publicly available information.

17. The system of claim 1, wherein the user lacks authorization to access at least one of the multiple distinct data sources.

18. A system for generating a user profile, comprising:
at least one processor; and
at least one non-transitory computer-readable media storing instructions that, when executed by the at least one processor, cause the system to perform operations comprising:

receiving, from a device of a user, a request to generate an authenticated user profile, determining, from the request, first publicly available information associated with a first entity and second information concerning a communication channel of the request, the second information associated with a second entity distinct from the first entity, accessing, using credentials of the system, multiple distinct data sources in a specified order to retrieve additional information by using previously retrieved information to generate keys for subsequent information retrieval, accessing comprising:

accessing a first one of the multiple distinct data sources using the first publicly available information as a key to retrieve a first item of the additional information, accessing a second one of the multiple distinct data sources using the second information as a key to retrieve a second item of the additional information, wherein the first item of the additional information or the second item of the additional information comprises a foreign key value for a third one of the multiple distinct data sources, and identifying items of the additional information associated with the user, generating a user profile based in part on the additional information, and providing the user profile to a second system distinct from the system for generating the user profile.

19. The system of claim 18, wherein identifying items of the additional information associated with the user further comprises:

comparing items of the additional information retrieved using the first publicly available information and items of the additional information retrieved using the second information, identifying an item of the additional information associated with another user based on the comparison, and wherein the user profile comprises the identified item of the additional information associated with the other user.

20. The system of claim 18, wherein the operations further comprise providing, to the device of the user after retrieving the additional information, at least one of a request to confirm an item of the additional information or to provide further publicly available information.

21. The system of claim 18, wherein the second system distinct from the system for generating the user profile comprises the user device.

22. The system of claim 18, wherein the specified order is determined at run-time by constructing and updating a dependency graph.

23. The system of claim 18, wherein the operations further comprise forwarding information generated by the second system to the user.

* * * * *